(12) United States Patent
Nakamura et al.

(10) Patent No.: US 8,922,141 B2
(45) Date of Patent: Dec. 30, 2014

(54) RECIPROCATING ELECTRIC TOOL

(75) Inventors: Mizuho Nakamura, Hitachinaka (JP); Kimitaka Abo, Mito (JP); Teruo Imai, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 13/143,077

(22) PCT Filed: Jan. 20, 2010

(86) PCT No.: PCT/JP2010/050997
§ 371 (c)(1),
(2), (4) Date: Jun. 30, 2011

(87) PCT Pub. No.: WO2010/087351
PCT Pub. Date: Aug. 5, 2010

(65) Prior Publication Data
US 2011/0273117 A1 Nov. 10, 2011

(30) Foreign Application Priority Data
Jan. 30, 2009 (JP) .................................. 2009-020276

(51) Int. Cl.
*H02P 1/00* (2006.01)
*B23D 51/16* (2006.01)
*B23Q 5/027* (2006.01)
*B25D 11/00* (2006.01)
*B25D 11/12* (2006.01)

(52) U.S. Cl.
CPC .............. *B23D 51/16* (2013.01); *B23Q 5/027* (2013.01); *B25D 11/005* (2013.01); *B25D 11/12* (2013.01)

USPC .......................................................... 318/139

(58) Field of Classification Search
USPC .............................................. 318/139; 173/2
See application file for complete search history.

(56) References Cited

U.S. PATENT DOCUMENTS

| 5,782,000 | A | 7/1998 | Bednar |
| 6,560,880 | B1 | 5/2003 | Itoh |
| 7,204,322 | B2 * | 4/2007 | Sakai .......................... 173/162.1 |
| 7,216,434 | B2 | 5/2007 | Eto et al. |
| 2002/0081163 | A1 | 6/2002 | Courtney |

(Continued)

FOREIGN PATENT DOCUMENTS

| CN | 1507378 A | 6/2004 |
| CN | 1874871 A | 12/2006 |

(Continued)

OTHER PUBLICATIONS

Japan Patent Office action for application JP2009-020276 (Mar. 28, 2013).

(Continued)

*Primary Examiner* — Bentsu Ro
*Assistant Examiner* — Zoheb Imtiaz
(74) *Attorney, Agent, or Firm* — Kilpatrick Townsend & Stockton LLP

(57) ABSTRACT

The invention provides a reciprocating electric tool (1) having a brushless motor (3), a plunger (52), and control means (6). The plunger (52) is driven by the brushless motor and reciprocating between two dead centers. A end bit (7) is mounted to one end of the plunger in a reciprocating direction. The control means (6) controls a rotational speed of the brushless motor based on a position of the plunger.

12 Claims, 8 Drawing Sheets

(56) References Cited

U.S. PATENT DOCUMENTS

| | | |
|---|---|---|
| 2003/0163924 A1 | 9/2003 | Hempe et al. |
| 2005/0023017 A1 | 2/2005 | Sakai |
| 2010/0236802 A1 | 9/2010 | Berger et al. |

FOREIGN PATENT DOCUMENTS

| | | |
|---|---|---|
| FR | 2 623 990 A1 | 6/1989 |
| JP | 62-009878 A | 1/1987 |
| JP | 05-005603 A | 1/1993 |
| JP | 2000-503914 A | 4/2000 |
| JP | 2000-350516 A | 12/2000 |
| JP | 2004-001363 A | 1/2004 |
| JP | 2005-046939 A | 2/2005 |
| JP | 2005-335032 A | 12/2005 |
| JP | 2008-544871 A | 12/2008 |
| WO | WO03/066262 A2 | 8/2003 |
| WO | WO 2005/049267 A1 | 6/2005 |

OTHER PUBLICATIONS

International Preliminary Report on Patentability and Written Opinion of the International Searching Authority of Aug. 11, 2011.

Office Action from China Intellectual Property Office for application CN201080005984.2 (Jan. 25, 2013).

Japan Patent Office office action for patent application JP2013-203736 (Jun. 19, 2014).

\* cited by examiner

RECIPROCATING ELECTRIC TOOL

This application is a U.S. National Stage of International Application No. PCT/JP2010/050997 filed Jan. 20, 2010, and which claims the benefit of Japanese Patent Application No. 2009-020276, filed Jan. 30, 2009, the entireties of which are incorporated by reference herein.

TECHNICAL FIELD

The present invention relates to a reciprocating electric tool, and more particularly relates to a portable reciprocating electric tool provided with an end bit, such as a blade, for cutting a workpiece by reciprocating movements of the end bit.

BACKGROUND ART

A conventional reciprocating electric tool, such as a jigsaw, includes a blade and a base that directly contacts a workpiece. The blade is designed to protrude from the base so as to be capable of moving in a vertical direction with respect to the base, thereby allowing the workpiece to be cut.

PATENT LITERATURE

PLT1: Japanese Patent Application Publication No. 2004-1363

SUMMARY OF INVENTION

Technical Problem

In such a conventional reciprocating electric tool, when performing reciprocal movements (vertical movements in case of a jigsaw), an end bit (the blade) and a plunger on which the blade is mounted are required to reverse a motion direction thereof at both dead centers (top dead center and bottom dead center). At these dead centers, the motion direction of the blade (the plunger) is forced to be turned around drastically, causing vibrations and noises to occur.

Further, when carrying the reciprocating electric tool, since the blade is a bother, a user has to grasp the blade for pushing the same into the base, or to manipulate an operation switch in order for the blade (plunger) to stop at one of the dead centers where the blade is retracted most (at the top dead center in case of the jigsaw). To the contrary, when replacing the blade, the user needs to grasp the blade for pulling the same out of the base, or to manipulate the operation switch so that the blade can be located at the other dead center where the blade protrudes most (at the bottom dead center in case of the jigsaw) in order to facilitate replacement of the blade. Either case results in low workability.

Solution to Problem

In view of the forgoing, it is an object of the present invention to provide a reciprocating electric tool, with enhanced workability, capable of realizing low vibration and low noise.

In order to achieve the above and other objects, the present invention features a reciprocating electric tool having a brushless motor, a plunger, and control means. The plunger is driven by the brushless motor and reciprocating between two dead centers. An end bit is mounted to one end of the plunger in a reciprocating direction. The control means controls a rotational speed of the brushless motor based on a position of the plunger.

With this configuration, the position of the plunger can be easily controlled by the brushless motor.

In the reciprocating electric tool having the above configuration, preferably, detection means for detecting the position of the plunger be provided.

With this configuration, since detection of the position of the plunger can become easier, the position and speed of the plunger can be controlled more easily. Preferably, the detection means be a sensor that detects that the plunger reaches a predetermined position.

With this configuration, the position of the plunger can be detected more precisely with a simple configuration. Therefore, controlling the position and speed of the plunger can be done with high accuracy.

Preferably, the control means decelerates the rotational speed of the brushless motor in accordance with the position of the plunger.

With this configuration, the brushless motor can be decelerated in accordance with the position of the plunger, thereby reducing noises and vibrations.

Preferably, the control means decelerates the rotational speed of the brushless motor, while the plunger moves from one of the dead centers to an other of the dead centers.

With this configuration, the brushless motor can be decelerated before the moving direction of the plunger is turned around, thereby enabling noises and vibrations to be reduced at the time of turning the moving direction of the plunger.

Preferably, the control means decelerates the rotational speed of the brushless motor when the plunger reaches a position in proximity to and just before either one of the dead centers.

With this configuration, the brushless motor can be slowed down before the moving direction of the plunger is switched, thereby reducing noises an vibrations at the time of switching the direction in which the plunger moves.

Preferably, the control means decelerates the rotational speed of the brushless motor when the plunger reaches a position in proximity to and just before either one of the dead centers, and after the plunger passes through the either one of the dead centers, the control means accelerates the rotational speed of the brushless motor.

With this configuration, the brushless motor can be slowed down before the moving direction of the plunger is switched, thereby reducing noises an vibrations at the time of switching the direction in which the plunger moves. At the same time, the motor can be subsequently speeded up, thereby maintaining the ability to cut the workpiece.

Preferably, speed decelerating position setting means is provided for setting a speed decelerating position of the rotational speed for the brushless motor according to the position of the plunger. The control means decelerates the rotational speed of the brushless motor in accordance with the speed decelerating position set by the speed decelerating position setting means.

With this configuration, the deceleration position of the brushless motor can be arbitrarily set. Hence, the deceleration position can be set to such a position at which vibrations and noises are generated most.

Preferably, the control means maintains the brushless motor at the reduced rotational speed until the plunger passes through either one of the dead centers.

This configuration contributes to reduction of vibrations and noises generated at the time of the plunger's turning around the moving direction thereof.

Preferably, the control means maintains the rotation of the brushless motor in a reduced speed state for a predetermined time period since the rotational speed of the brushless motor is reduced.

With this configuration, the brushless motor is kept decelerated for a prescribed period of time, thereby leading to reduction in vibrations and noises.

Preferably, storage means is provided for storing a plurality of speed decelerating position information which the speed decelerating position setting means sets. the control means calculates a first time period to maintain the brushless motor in a reduced speed state, based on the speed decelerating position set by the speed decelerating position setting means, and stores the calculated first time period as a reduced speed maintaining period in the storage means, and the control means maintains the brushless motor in the reduced speed state until the speed reduction maintaining period stored in the storage means elapses.

With this configuration, the deceleration position can be set to a position at which noises and vibrations are assumed to be generated most. Further, the brushless motor is maintained to be decelerated while the vibrations and noises continue. Hence, reduction in noises and vibrations can be further realized.

Preferably, the control means calculates a second time period to reach the dead point at a first since the rotational speed of the brushless motor is decelerated based on the speed decelerating position information, and stores the calculated second time period in the storage means, and the rotation of the brushless motor is accelerated after the plunger passes through the dead point.

With this configuration, the brushless motor is slowed down in the vicinity of the dead centers where noises and vibrations are assumed to occur most intensively.

Preferably, speed setting means is provided for setting the rotational speed of the brushless motor. Further, storage means is provided for storing a plurality of speed decelerating position which the speed decelerating position setting means sets. The control means calculates a reduced speed maintaining time period to maintain the brushless motor in the reduced speed state based on the speed decelerating position set by the speed decelerating position setting means and the rotational speed of the brushless motor set by the speed setting means, and stores the calculated reduced speed maintaining time period in the storage means.

With this configuration, the deceleration position can be set in accordance with the setting speed of the brushless motor. Hence, vibrations and noises can be reduced regardless of the setting speed of the brushless motor.

Preferably, speed setting means is provided for setting the rotational speed of the brushless motor. Further, storage means is provided for previously storing a reduced speed maintaining time period to maintain the brushless motor in the speed reduced state, based on a setting signal from the speed setting means and the speed decelerating position setting means. The control means decelerates the rotation of the brushless motor according to the reduced speed maintaining time period stored in the storage means.

With this configuration, the deceleration position can be stored in advance based on the rotational speed of the brushless motor and the deceleration position information. Hence, in addition to the reduction in noises and vibrations regardless of the setting speed of the brushless motor, the control means does not have to perform calculation each time the speed of the brushless motor is set.

Preferably, storage means is provided for storing a predetermined rotational speed of the brushless motor. The control means maintains the rotation of the brushless motor at a fixed rotational speed regardless of an output from the speed decelerating position setting means when the rotational speed of the brushless motor set by the speed setting means is lower than the predetermined rotational speed stored in the storage means.

With this configuration, when the rotational speed of the brushless motor is slow, specially when the rotational speed is the slowest, the brushless motor is not controlled to be decelerated. Hence, the ability of the reciprocating electric tool to cut a workpiece can be maintained.

Preferably, reset means is provided for resetting a decelerating position of the brushless motor which has been set by the deceleration position setting means.

With this configuration, the deceleration position can be easily set to such a position that greater noises and vibrations are assumed to be generated.

Preferably, the control means controls the brushless motor in order to stop the plunger in proximity to one of the dead centers.

With this configuration, the plunger is allowed to stop at a position where the plunger protrudes most from the base of the reciprocating electric tool so that the blade can be replaced easily. The plunger is further allowed to stop at a position where the plunger is retracted most. Hence, when the user carries the reciprocating electric tool, the plunger and the end bit do not bother the user.

Preferably, stop position switching means is provided for switching the stop position of the plunger to an other of the dead centers.

With this configuration, the stop position of the plunger can be selected depending on the intended purposes of the user, leading to an improved workability.

Preferably, stop position setting means is provided for setting a stop position of the plunger. the control means controls the plunger in order to stop the plunger at a predetermined position set by the stop position setting means.

This configuration enables the user to stop the plunger at a prescribed position in accordance with the usages intended by the user, for example, for the purpose of carrying the reciprocating electric tool or replacing the end bit. The workability is therefore enhanced.

Preferably, the stop position setting means outputs a signal to the control means the signal being for stopping the plunger in proximity to either one of the dead centers. The control means controls the brushless motor in order to stop the plunger according to the output signal from the stop position setting means.

With this configuration, when the plunger stops at the most protruding position, replacement of the end bit can be facilitated. When the plunger stops at the most retracting position, the portability of the reciprocating electric tool is not damaged.

Further, conventionally, the stop position of the plunger cannot be specified by the user. Hence, the portion on which the end bit is mounted is required to have a large dimension so that the end bit can be replaced regardless of the position of the plunger. To the contrary, since the reciprocating electric tool according to the present invention enables the stop position to be specified by the user, the portion on which the end bit is mounted can be made compact, thereby realizing reduction in size and weight of the reciprocating electric tool.

Preferably, the stop position setting means outputs a switching signal to the control means, the signal being for switching the stop position of the plunger to a position in proximity to an other of the dead centers. The control means controls the brushless motor according to the switching signal.

This configuration allows the user to select positions at which the plunger stops based on the purposes intended by the user, leading to enhanced workability.

Preferably, rotational position detecting means is provided for detecting a rotational position of the brushless motor. Further, storage means is provided for prestore positional data associated with a rotational position of the brushless motor and a position of the plunger, on the basis of the position of the plunger corresponding to the rotational position of the brushless motor. The control means calculates the position of the plunger on the basis of the rotational position of the brushless motor detected by the rotational position detecting means and positional data stored in the storage means.

With this configuration, the position of the plunger can be detected based upon the rotating position information of the brushless motor. Hence, there is no need to employ means for detecting the position of the plunger.

Preferably, storage reset means is provided for resetting the positional data associated with the rotational position of the brushless motor and the position of the plunger stored in the storage means.

With this configuration, the user can reset the relationship between the rotating positions of the brushless motor and the position of the plunger stored in the storage means whenever there arises an error in the relationship therebetween.

Preferably, storage reconfiguring means for reconfiguring positional data associated with the rotational position of the brushless motor and the position of the plunger stored in the storage means.

With this configuration, since the relationship between the rotating position of the blushless motor and the position of the plunger can be stored precisely, the brushless motor can be controlled with accuracy depending on the position of the plunger.

Further, a battery may be provided for supplying power to the brushless motor.

This configuration increases portability of the reciprocating electric tool, thereby enhancing the workability thereof.

Further, an AC power source may be provided for supplying power to the brushless motor.

With this configuration, the user can operate the reciprocating electric tool for a longer period of time, thereby increasing the workability thereof.

The present invention further provides a reciprocating electric tool having a brushless motor, a plunger, and control means. The plunger is driven by the brushless motor and reciprocating between two dead centers. An end bit is mounted to one end of the plunger in a reciprocating direction. The control means controls a rotational speed of the brushless motor based on a position of the plunger during a cycle of reciprocation movement of the plunger.

With the above structure, the position of the plunger can be easily controlled by the brushless motor during the cycle of the reciprocation movement of the plunger.

The present invention further provides a reciprocating electric tool having a brushless motor, a plunger, and control means. The plunger is driven by the brushless motor and reciprocating between two dead centers. An end bit is mounted to one end of the plunger in a reciprocating direction. The control means controls the brushless motor to stop the plunger in a predetermined stop area.

With the above structure, the position of the plunger can be easily controlled by the brushless motor. Generally, the stop position of the plunger is a predetermined position such as each dead center. Additionally, any position such as an adjacent area to the predetermined position and a predetermined area including the predetermined position can be selected as the stop position of the plunger.

Advantageous Effects of Invention

According to the present invention, workability can be enhanced while vibrations and noises are suppressed at a low level.

BEST MODE FOR CARRYING OUT THE INVENTION

Hereinafter, a reciprocating electric tool (jigsaw) 1 according to an embodiment of the present invention will be described with reference to FIGS. 1 through 7.

Figure 1:
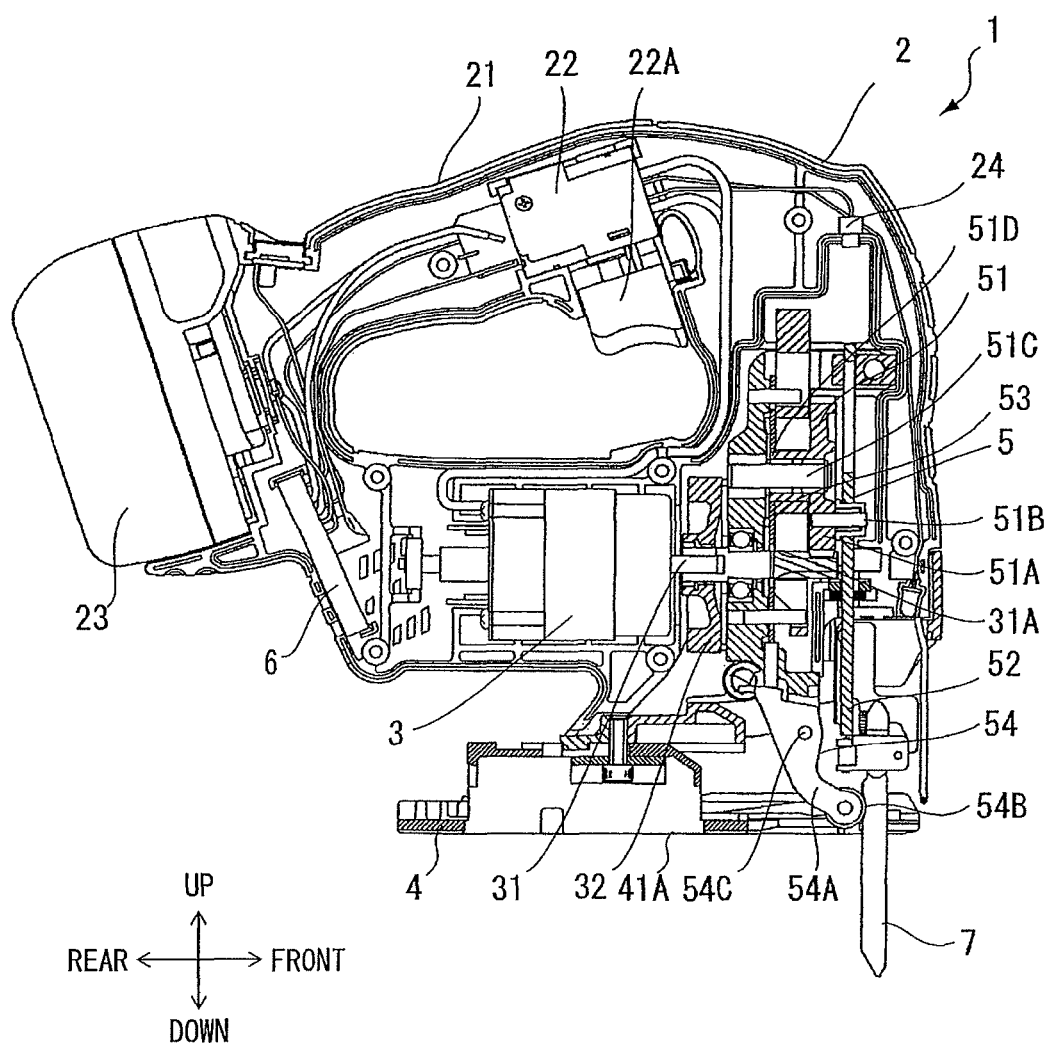
FIG. 1 is a side cross-sectional view of a reciprocating electric tool according to an embodiment of the present invention.

As shown in FIG. 1, the jigsaw 1 includes a housing 2, a motor 3, a base 4, a drive section 5, a control unit 6 and a blade 7 serving as an end bit. The jigsaw 1 moves in a designated direction while cutting a workpiece (not shown) with the blade 7. In the following description, a direction in which the jigsaw 1 moves while cutting the workpiece will be referred to as a 'cutting direction.' In the cutting direction, a side toward which the jigsaw 1 heads will be referred to as 'forward'. Also, a vertical (top-to-bottom) direction is defined as follows: a direction from the housing 2 toward the base 4 will be referred to as the 'lower' direction, while a direction toward the housing 2 from the base 4 will be referred to as the 'upper' direction. Further, a horizontal (left-to-right) direction will be defined as a direction perpendicular to the vertical direction as well as the cutting direction.

The housing 2 is configured of a frame which is made of a material such as aluminum. The housing 2 is formed with a handle 21 at an upper rear end portion thereof for enabling a user to grip the jigsaw 1. A trigger switch 22 including a trigger 22A is provided on a base end portion of the handle 21 so that the user can operate the trigger 22A to control electric power supply to the motor 3.

A battery 23 is detachably mounted in the jigsaw 1 at a position rearward of the handle 21 in the cutting direction.

The battery 23 supplies, as a power source, electric power to the motor 3, the control unit 6 and the like, thereby contributing to improved portability and workability of the jigsaw 1. As an alternative power source, an external commercial power supply (an AC power source 90) may be used as shown FIG. 8 instead of the battery 23. In this case, a converter 80 is required for converting an alternating current to a direct current (see FIG. 8). Employing the AC power source 90 is advantageous in that the user can use the jigsaw 1 for a longer period of time, leading to an improved workability.

Within the housing 2 a position sensor 24 (proximity sensor, for example) is provided at a position above the drive section 5. The position sensor 24 detects movements of a plunger 52 between both dead centers (as will be described later) and outputs signals to the control unit 6. Hence, the position sensor 24 should preferably be located at a position vertically above the longitudinal direction of the plunger 52.

The motor 3 is a DC brushless motor for allowing the control unit 6 to precisely control rotational speeds and rotational angles of the motor 3. The motor 3 is accommodated within the housing 2 approximately in the middle thereof. An output shaft 31 protrudes from the motor 3 in a direction substantially parallel to the horizontal direction, and a pinion gear 31A is provided on an end of the output shaft 31. A cooling fan 32 is also provided on the output shaft 31 at a base end portion thereof. The cooling fan 32 introduces air into the housing 2 from an inlet port (not shown) formed on the housing 2 so that the motor 3 and the control unit 6 can be cooled down with the air.

The base 4 is mainly made of aluminum, and formed in a substantially rectangular shape. The base 4 has an opposing surface 41A which is in opposition to and in contact with the workpiece (a wooden plate). The longitudinal direction of the substantially rectangular opposing surface 41A is configured to be coincident with the cutting direction of the jigsaw 1. In this way, the base 4 supports the housing 2. Assume an imaginary axis extending in the horizontal direction on the opposing surface 41A and intersecting the blade 7. The housing 2 is configured to be pivotally movable about this imaginary axis (a pivot axis) relative to the base 4.

The blade 7 has a cutting teeth section and a back section. As shown in FIG. 1, the blade 7 is mounted on the plunger 52 (described later) such that the cutting teeth section faces upward and forward in the cutting direction and the back section faces rearward in the cutting direction.

The drive section 5 is mainly configured of a crank section 51, the plunger 52, a power transmission section 53 and a roller holder 54.

The crank section 51 includes a spur gear 51A, a pin 51B and a spindle 51C. The spur gear 51A meshingly engages the pinion gear 31A. The spur gear 51A is provided with a cam 51D at a base end portion thereof. The cam 51D engages the power transmission section 53. The pin 51B protrudes forward from the spur gear 51A such that an axis of the pin 51B extends in a direction parallel to a rotational axis of the spur gear 51A. The axis of the pin 51B and the rotational axis of the spur gear 51A are different from each other. The spindle 51C is fixed to the housing 2 for rotatably supporting the spur gear 51A.

Figure 2:
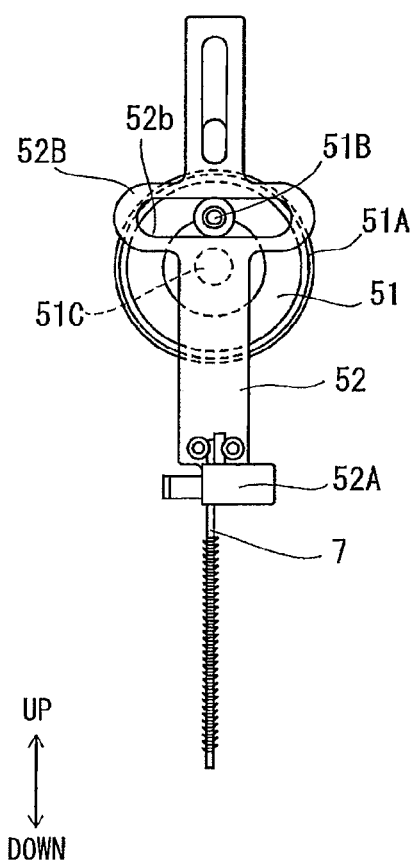
FIG. 2 is a view showing a drive unit and a blade of the reciprocating electric tool according to the present embodiment.

The plunger 52 is formed in a substantially rod like shape. The plunger 5 is slidingly movably supported within the housing 2 such that the longitudinal direction of the plunger 52 is in parallel with the vertical direction. As shown in FIG. 2, the plunger 52 includes a holding section 52A and a receiving section 52B. The holding section 52A holds the blade 7 and is provided on the plunger 52 at the lower end thereof. The receiving section 52B is formed at a center of the plunger 52.

The receiving section 52B is formed with a groove 52b extending in the horizontal direction (left-to-right direction) within which the pin 51B is inserted. The pin 51B is allowed to move in the horizontal direction but restricted to move vertically within the groove 52b. Hence, the receiving section 52B is only allowed to make vertical movements in conjunction with the movements of the pin 51B. In other words, the pivotal movements of the pin 51B about the spindle 51C can be converted into the vertical movements of the plunger 52. The plunger 52 moves in the vertical direction within a predetermined range of stroke S (See FIG. 4).

As shown in FIG. 1, the power transmission section 53 is supported to the housing 2 and engages the cam 51D such that the power transmission section 53 is capable of moving in the vertical direction within the housing 2. The power transmission section 53 has a bottom portion that contacts the roller holder 54.

The roller holder 54 is configured of a holder 54A, a roller 54B and a shaft 54C extending in the left-to-right direction. The holder 54A is disposed rearward of the blade 7 and is pivotably movable about the shaft 54C in a direction perpendicular to the left-to-right direction. The holder 54A has an upper portion that contacts the bottom portion of the power transmission section 53. Hence, in accordance with the vertical movements of the power transmission section 53, the holder 54A pivotably moves in counterclockwise and clockwise directions in FIG. 1. The roller 54B is rotatably supported to a bottom portion of the holder 54A, while in contact with the back section of the blade 7.

The control unit 6 is disposed rearward of the motor 3 as shown in FIG. 1 so that the control unit 6 can be situated in a path of the air generated by the rotation of the cooling fan 32. The control unit 6 includes a control circuit 61 and an FET drive circuit (inverter circuit) 62, as will be described later.

Next, the control unit 6 will be described in more detail with reference to FIG. 7. The motor 3 (DC brushless motor) includes a rotor 3A, a stator 3B, and stator windings (armature windings) 3C. The rotor 3A has permanent magnets having south and north poles that are embedded therein and extend toward the output shaft 31. The stator 3B has a substantially hollow cylindrical outline and the rotor 3A is disposed within the stator 3B. The stator winding 3C are concentrically disposed within the stator 3B. The stator windings 3C are configured of three-phase windings U, V and W of the stator 3B. Each stator winding 3C is star-connected and wound within a slot of the stator 3B via an insulation layer (not shown: made of a resin material) such that the stator windings 3C surround the stator 3B.

Three hole ICs 65, 66 and 67 are disposed in the vicinity of the rotor 3A for detecting rotating positions of the rotor 3A. Each of the hole ICs 65, 66 and 67 is arranged at every 60 degrees along the rotating direction of the rotor 3A. The FET drive circuit 62 controls the current flowing into the stator windings 3C based on position detection signals outputted from the hole ICs 65, 66 and 67. At this time, the current flowing into the stator winding 3C is controlled to fall within a conducting range of an electric angle of 120°.

Figure 7:
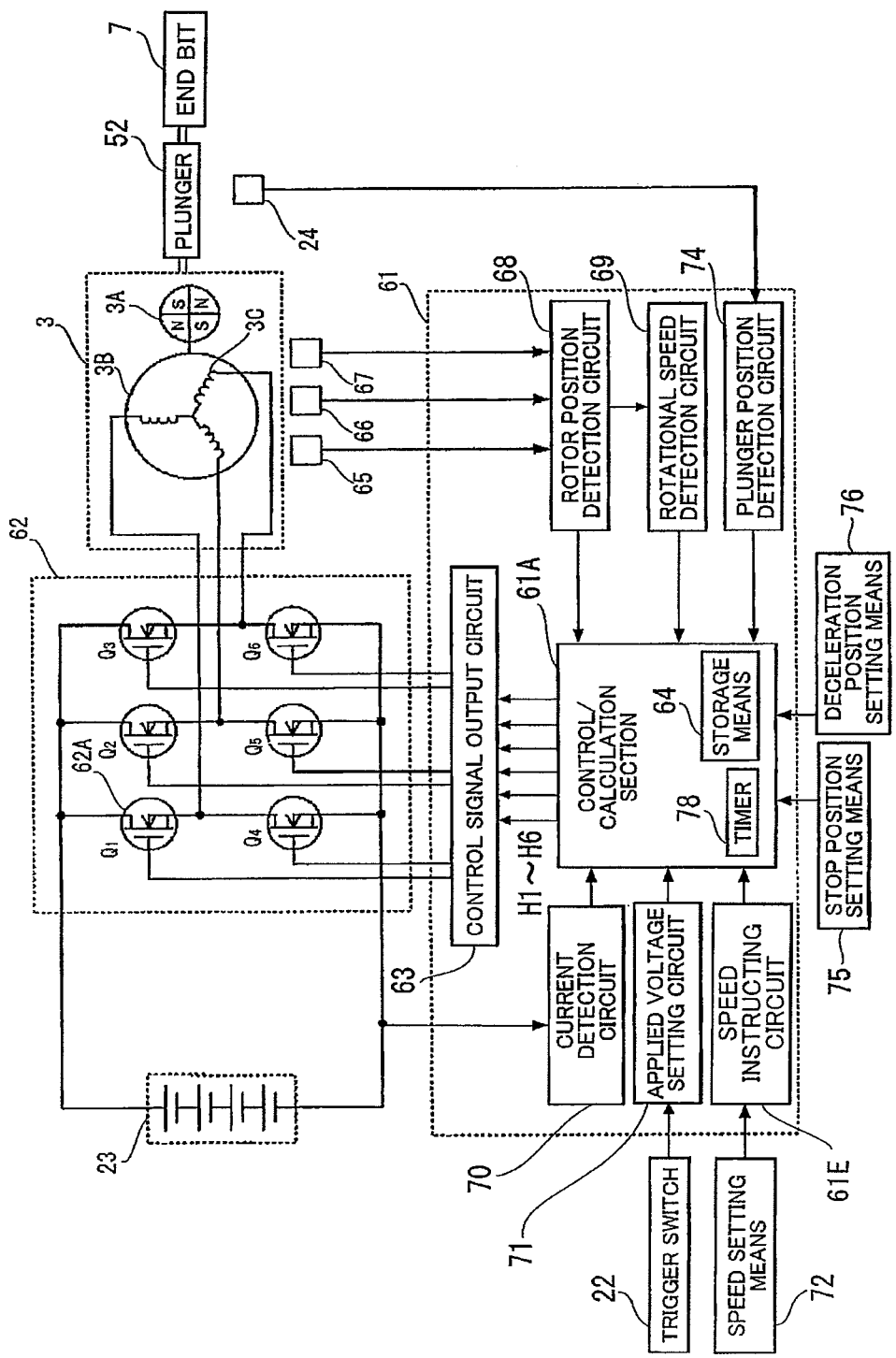
FIG. 7 is a control block diagram of the reciprocating electric tool according to the present embodiment.

As shown in FIG. 7, the FET drive circuit 62 includes six three-phase bridge connected semiconductor switching elements 62A. The semiconductor switching elements 62A are configured of insulated gate bipolar transistors (IGBT) Q1-Q6. Six bridge-connected FETs may also be employed instead of the semiconductor switching elements 62A. Each gate of the semiconductor switching elements 62A (Q1-Q6) is connected to a control signal output circuit 63 of the control circuit 61. On the other hand, either collector or emitter of each of the semiconductor switching elements 62A is connected to the star-connected stator windings 3C (U, V and W) of the motor 3. With this configuration, the six semiconductor switching elements 62A perform a switching operation in accordance with PWM drive signals (switching signals) H1-H6 inputted from the control signal output circuit 63, convert the direct current of the battery 23 applied to the FET drive circuit 62 into voltages of three phases (U-phase, V-phase and W-phase) Vu, Vv and Vw, and supply the three-phase alternating current to the stator windings 3C.

The control circuit 61 controls the motor 3 and others by outputting the switching signals H1-H6 to the FET drive circuit 62 via the control signal output circuit 63. The control circuit 61 includes a control/calculation unit 61A, a rotor position detection circuit 68, a rotational speed detection circuit 69, a current detection circuit 70, an applied voltage setting circuit 71, a speed instructing circuit 61E and a plunger position detection circuit 74.

The control/calculation unit 61A includes a microcomputer for generating output signals to be outputted to the control signal output circuit 63 based on processing programs, control data and input signals such as motor position signals. The rotor position detection circuit 68 detects positional relationships between the rotor 3A and the stator windings 3C of the stator 3B based on the output signals from the hole ICs 65, 66 and 67, and outputs information on positions of the rotor 3A to the control/calculation unit 61A. The rotational speed detection circuit 69 detects rpm of the motor 3 from intervals of the signals outputted from the hole ICs 65, 66 and 67.

The current detection circuit 70 continuously detects drive current flowing through the motor 3 and outputs detection signals to the control/calculation unit 61A. The applied voltage setting circuit 71 sets PWM duty ratio of the switching signals corresponding to output control signals which are generated by the trigger switch 22 in response to the amounts of depression of the trigger 22A. The speed instructing circuit 61E outputs indicated speed signals to the control/calculation unit 61A in accordance with signals from speed setting means 72 (volume VR) that sets rotational speeds of the motor 3. The plunger position detection circuit 74 detects the position of the plunger 52 from detection signals of the position sensor 24.

The control/calculation unit 61A controls voltages applied to the stator windings 3C of the motor 3 (Vu, Vv and Vw) by controlling the PWM duty ratio of the PWM drive signals of the semiconductor switching elements 62A in accordance with the output signals from the current detection circuit 70, the applied voltage setting circuit 71, the speed instructing circuit 61E and the like. The control/calculation unit 61A also controls the voltages (Vu, Vv and Vw) applied to the stator windings 3C in a prescribed order by switching the semiconductor switching elements 62A in the prescribed order, thereby controlling rotation of the motor 3.

The control/calculation unit 61A also calculates the position of the plunger 52 based on the output signals of the plunger position detection circuit 74, thereby controlling the rotational speed of the motor 3 (to speed up, speed down or stop) in accordance with the position of the plunger 52.

The control/calculation unit 61A is further connected to deceleration position setting means 76 and stop position setting means 75. The deceleration position setting means 76 designates a position at which the plunger 52 needs to decelerate during the reciprocal movements thereof (See a1 and a2 in FIG. 4). The stop position setting means 75 sets a position at which the plunger 52 stops when the trigger switch 22 is turned off. The control/calculation unit 61A controls rotational speeds and rotational angles of the motor 3 based on the position of the plunger 52 detected by the position sensor 24 and the output signals of the stop position setting means 75 and the deceleration position setting means 76.

The control circuit 61 changes the PWM duty ratios of the switching signals of the semiconductor switching elements 62A in accordance with the output signals of the applied voltage setting circuit 71 that corresponds to the amounts of depression of the trigger 22A and the motor speed signals that is set by the speed setting means 72 and is outputted from the speed instructing circuit 61E. In this way, the control circuit 61 regulates electric power supply to the motor 3, thereby controlling rotational speed of the motor 3. When the trigger 22A is depressed fully to the maximum amount thereof, the control circuit 61 controls the rotational speed (rpm) of the motor 3 to be equal to the rpm set by the speed setting means 72.

The control/calculation unit 61A is configured of a microcomputer. The microcomputer includes a CPU (not shown), a ROM (storage means 64), a RAM (storage means 64) and a timer 78 (see FIG. 7). The CPU outputs drive signals based on processing programs and each processed data. The ROM stores processing programs for executing control routines described later and control data. The RAM temporality stores data, such as positional relationship between the plunger 52 and the motor 3 (the rotor 3A) and time periods during which the plunger 52 makes reciprocal movements and moves from a deceleration position to either dead center at a prescribed speed. The timer 78 counts time during which the plunger 52 moves from a prescribed position to a dead center.

Figure 3:
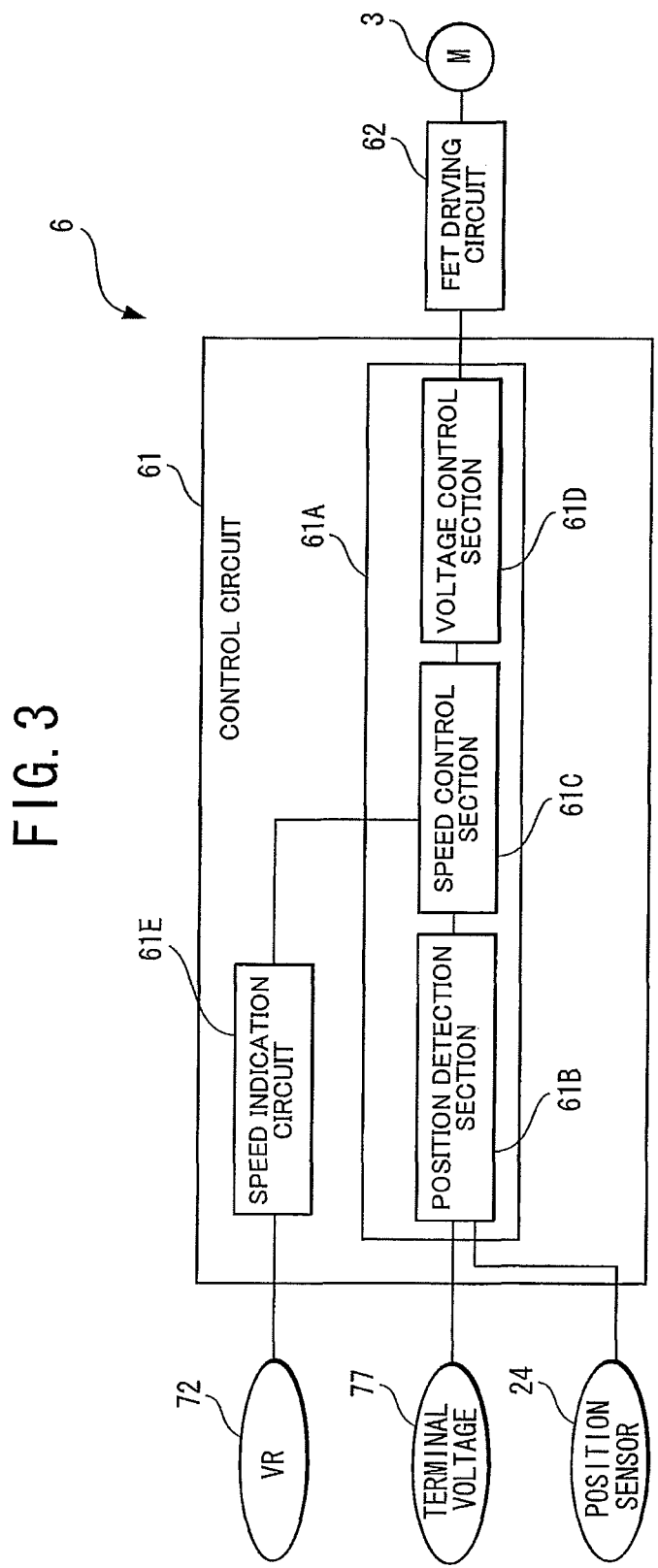
FIG. 3 is a schematic circuit diagram of a control unit of the reciprocating electric tool according to the present embodiment.

The control/calculation unit 61A further includes a position detection section 61B, a speed control section 61C and a voltage control section 61D, as shown in FIG. 3.

The position detection section 61B is connected to the rotor position detection circuit 68 (the rotational speed detection circuit 69) and the plunger position detection circuit 74. In accordance with the signals outputted from these circuits, the position detection section 61B calculates rotating positions and rotational speeds of the motor 3 and the position of the plunger 52. Alternatively, terminal voltage detection means 77 may be connected to the position detection section 61B instead of the rotor position detection circuit 68, as will be described later.

The speed control section 61C determines whether the rotational speed of the motor 3 becomes the designated motor speed by referring to the designated motor speed signal outputted from the speed instructing circuit 61E based on the signals from the speed setting means 72, the motor rotational speed signals from the position detection section 61B, the motor rotating position signals, and the plunger position signals.

The voltage control section 61D outputs drive signals regarding the motor 3, via the control signal output circuit 63, to the FET drive circuit 62 based on the output signals from the speed control section 61C.

In the jigsaw 1 having the above-described configuration, when the battery 23 is mounted on (therefore connected to) the housing 2 and the user of the jigsaw 1 operates the trigger switch 22, the motor starts to rotate. In response to the rotation to the motor 3, driving force of the motor 3 is transmitted, from the output shaft 31 of the motor 3, to the plunger 52 via the power transmission section 53, thereby enabling the plunger 52 to make reciprocating movements. Following the reciprocal movements of the plunger 52, the blade 7 mounted on the tip of the plunger 52 can cut the workpiece.

More precisely, when the trigger switch 22 is operated, the applied voltage setting circuit 71 outputs a signal corresponding to the amount of depression of the trigger 22A to the control circuit 61. Based on this signal, the control/calculation unit 61A generates switching signals for the semiconductor switching elements 62A and outputs the same to the FET drive circuit 62 via the control signal output circuit 63. The control/calculation unit 61A thus controls the motor 3 to rotate at a speed corresponding to the amount of depression of the trigger 22A, allowing the jigsaw 1 to cut the workpiece. The maximum speed of the motor 3 is set to be the speed specified by the speed setting means 72.

Subsequently, the control circuit 61 detects rotating positions and rotational speed of the rotor 3A with the signals from the hole ICs 65, 66 and 67 via the rotor position detection circuit 68 and the rotational speed detection circuit 69. In this way, the control circuit 61 controls the rotational speed of the motor 3. At the same time, the control circuit 61 calculates the position of the plunger 52 based on the outputs from the position sensor 24 and the plunger position detection circuit 74. Upon finding that the plunger 52 has reached the deceleration position, the control circuit 61 decelerates the plunger 52. When the trigger switch 22 is turned off, the control circuit 61 stops the plunger 52 at the stop position set by the stop position setting means 75 and terminates the operation of the jigsaw 1.

As an alternative method of detecting rotating positions of the rotor 3A, the terminal voltage detection means 77 may be provided, instead of the hole ICs 65, 66 and 67, for detecting terminal voltages (induced voltages) between the stator windings 3C of the motor 3, as shown in FIG. 3. In this case, the control circuit 61 detects rotating positions and rotational speed of the rotor 3A from the terminal voltages of the motor 3 (sensor-less method). The terminal voltage detection means 77 may be so configured as to retrieve terminal voltages between the stator windings 3C as logic signals through a filter.

Next, how the plunger 52 (the motor 3) is controlled and decelerated in the present embodiment will be described with reference to FIG. 4.

In the present embodiment, the control circuit 61 calculates the position of the plunger 52 based on either one of or both of the positional information of the plunger 52 from the position sensor 24 and the positional information of the rotor 3A of the motor 3.

In accordance with the positional information of the plunger 52, the control circuit 61 controls the rotational speed or rotating angle of the motor 3 when the plunger 52 comes to a prescribed position. In this way, in the jigsaw, vibrations and noises are reduced, while the workability is improved.

In the present embodiment, the motor 3 is set, with the deceleration position setting means 76, such that the motor 3 starts decelerating at positions close to both dead centers (before reaching both dead centers).

The control circuit 61 controls the rotation of the motor 3 by controlling switching operations of the semiconductor switching elements 62A of the FET drive circuit 62, thereby enabling the plunger 52 to make vertical movements. Assume that the motor 3 currently rotates at a rotational speed (first speed) that is set by the speed setting means 72. The control/calculation unit 61A always monitors the positional information of the plunger 52 coming from the position sensor 24. When the position sensor 24 and the plunger position detection circuit 74 detect that the plunger 52 is approaching to the positions close to, but before reaching, the both dead centers for each cycle of the vertical movements, the control/calculation unit 61A controls the semiconductor switching elements 62A so that the motor 3 can be slowed down to a second speed, which is slower than the first speed.

Figure 4:
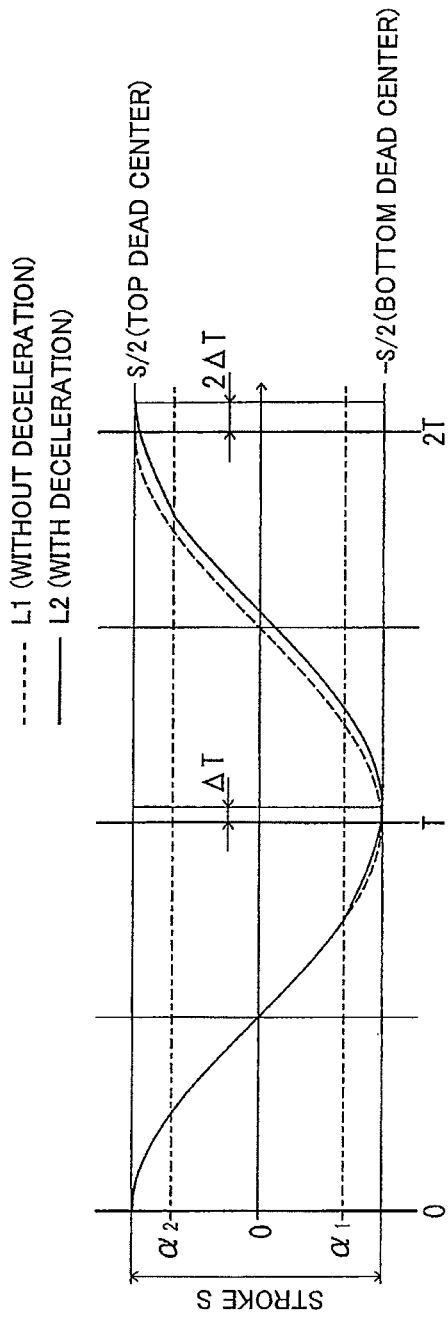
FIG. 4 is a graph illustrating relationships between time and positions of a plunger of the reciprocating electric tool according to the present embodiment.

Specifically, as shown in FIG. 4, when the plunger 52 is moving from the top dead center (at t=0) toward the bottom dead center, the motor 3 rotates at the first speed. Upon detecting that the plunger 52 has come to (or passed) a deceleration position designated by the deceleration position setting means 76, i.e., a positional before the bottom dead center, the control/calculation unit 61A (position detection section 61B) outputs, to the semiconductor switching elements 62A of the FET drive circuit 62, signals to slow down the rotational speed of the motor 3 from the first speed to the second speed. In this way, the rotational speed of the motor 3 is decelerated to the second speed from the first speed at the position α1.

There inevitably generated are noises and vibrations at both dead centers at which the plunger 52 changes the motion direction thereof. Hence, preferably, the rotational speed of the motor 3 is slowed down in the vicinity of both dead centers, especially at positions before reaching each dead center. With this configuration, inertial energy (motion energy) of the motor 3 can be reduced at positions where the direction of the movement of the plunger 52 is switched, thereby allowing the noises and vibrations to be suppressed most efficiently.

Referring to FIG. 4, L1 represents a case where the rotational speed of the motor 3 is maintained constantly at the first speed. L2 represents a case where the rotational speed of the motor 3 is slowed down from the first speed to the second speed at the position α1. In case of L1, moving the plunger 52 from the top dead center to the bottom dead center requires a time period of T. On the other hand in case of L2, the movement of the plunger 52 from the top dead center to the bottom dead center requires a time period of T+ΔT.

Here, the amount of movement of the plunger 52 is determined as ΔX per a marginal period of time Δt. The second speed is assumed to be set to a speed that is equal to 40 percent of the first speed. In this case, specifically, ΔX at the second speed is 40 percent of ΔX at the first speed. Provided that a mass M is identical, motion energy from the positional to the bottom dead center can be defined as being proportional to the square of the speed. i.e., $0.5 \times M \times (\Delta X/\Delta t)^2$ for L1. Hence, in FIG. 4, motion energy from the positional to the bottom dead center for L2 is $0.5 \times M \times (0.4 \times \Delta X/\Delta t)^2$, resulting in 16 percent of the motion energy of L1. At the bottom dead center, the speed vector of the plunger 52 becomes opposite, thereby inevitably generating an impact. Since the motion energy in case of L2 is only 16 percent of the motion energy of L1, the motion energy at the time of the impact in case of L2 is also reduced to be 16 percent of the motion energy in case of L1. In this way, with the reduced speed, the impact generated at the time of the change in the speed vector of the plunger 52 can be efficiently suppressed.

Upon detecting that the plunger 52 has reached (passed) the bottom dead center, the control/calculation unit 61A (the speed control section 61C) outputs switching signals H1-H6 indicative of the first speed to the semiconductor switching elements 62A of the FET drive circuit 62. The rotational speed of the motor 3 is thus speeded up to the first speed when the plunger 52 passes the bottom dead center.

The control/calculation unit 61A detects that the plunger 52 has reached the bottom dead center from the plunger position signals outputted from the position sensor 24. Alternatively, the storage means 64 may prestore time periods necessary for the plunger 52 to move from each deceleration position to either dead center. The control/calculation unit 61A may detect that the plunger 52 has reached the bottom end by measuring time period required for the plunger 52 to move from one deceleration position (α1) to the bottom dead center with the timer 78 and then by comparing the measured time period with the prestored time data. Still alternatively, the storage means 64 may store time ranges (a predetermined range within the amount of stroke S) at which vibrations and noises have been known to occur. As a further alternative, the storage means 64 may count and store a time period each time for the plunger 52 to move from one deceleration position to one dead center using the timer 78 in accordance with the signals from the position sensor 24. The control/calculation unit 61A may use this time period stored by the storage means 64 for detecting the position of the plunger 52.

In the present embodiment, the rotational speed (first speed) of the motor 3 can be configured to be set at a plurality of stages. Hence, the control/calculation unit 61A can calculate a time period during which the plunger 52 needs to be decelerated based on the setting speed and the deceleration position and store the same in the storage means 64. In this way, the control/calculation unit 61A can control the rotational speed of the motor 3 in accordance with the stored period of time. This configuration allows the jigsaw 1 to reliably control the motor 3 regardless of the setting speed of the motor 3, thereby suppressing occurrence of vibrations and noises. The workability of the jigsaw 1 can also be improved.

In the present embodiment, the rotational speed of the motor 3 is configured to be decelerated from the first speed to the second speed when the plunger 52 has approached areas where vibrations and noises would become large (i.e., in the vicinity of the bottom dead center), and subsequently to be accelerated from the second speed to the first speed after the plunger 52 has passed the bottom dead center. In this way, since the rotation of the motor 3 is not configured to be maintained at the reduced second speed even after the motor 3 has been once slowed down, the improved workability can be maintained while vibrations and noises can be held down.

Similarly, when the plunger 52 moves from the bottom dead center to the top dead center, the rotational speed of the motor 3 is decelerated to the second speed from the first speed at a position α2, as shown in FIG. 4. This position α2 has a phase different from the phase of the positional by 180 degree. In other words, the position α2 is a position in the vicinity of, but before the top dead center.

When the plunger 52 has passed the top dead center, the control/calculation unit 61A controls the semiconductor switching elements 62A such that the rotational speed of the motor 3 is speeded up again to the first speed from the second speed. Note that, a distance between the deceleration positional to the bottom dead center may not be identical to a distance between the deceleration position α2 to the top dead center. The deceleration position setting means 76 may set each deceleration position (α1 and α2) to be different from each other.

If the rotational speed (first speed) of the motor 3 is set to such a speed that the jigsaw 1 would not generate vibrations nor noises, or to such a speed that vibrations and noises are relatively low even when generated, the motor 3 does not need to be slowed down regardless of the settings of the deceleration position setting means 76. For example, the storage means 64 may prestore a rotational speed at which vibrations nor noises would not be generated. If the deceleration position setting means 76 sets a rotational speed that is equal to or smaller than the prestored speed, the control/calculation unit 61A controls the motor 3 not to slow down regardless of the rotational speed designated by the deceleration position setting means 76, thereby leading to improvement in the workability of the jigsaw 1.

Alternatively, a reset switch may be provided for resetting deceleration positions, deceleration time and positional information of the plunger 52 and the motor 3 stored in the storage means 64. In this case, each time the user uses the jigsaw 1, each of the above information may be configured to be reset by the reset switch. Therefore, the motor 3 is always controlled with the latest information.

As described above, the jigsaw 1 is controlled such that, while the plunger 52 makes the reciprocating movements (starting from the top dead center, to the deceleration position α1 before the bottom dead center, then to the bottom dead center, then to the deceleration position α2 before the top dead center, and back to the top dead center again), the rotational speed of the motor 3 is decelerated when the plunger 52 reaches prescribed positions α1 and α2. When cutting the workpiece by repeating such vertical movements, the jigsaw 1 can suppress impacts from being generated at the both dead centers, leading to improved workability. Note that, when the first speed and the second speed are alternately employed for the sake of suppressing generation of noises and vibrations as in the present embodiment, the time cycle of the plunger 52 (for L2) becomes longer by 2ΔT, compared to the case of L1, as shown in FIG. 4. However, this period is small enough to have little effect on the workability of the jigsaw 1. If there is some effect on the workability, the first speed may be set to be faster in advance.

Next, a description will be given on how the plunger 52 (the blade 7) is controlled when the jigsaw 1 stops operating.

Figure 5:
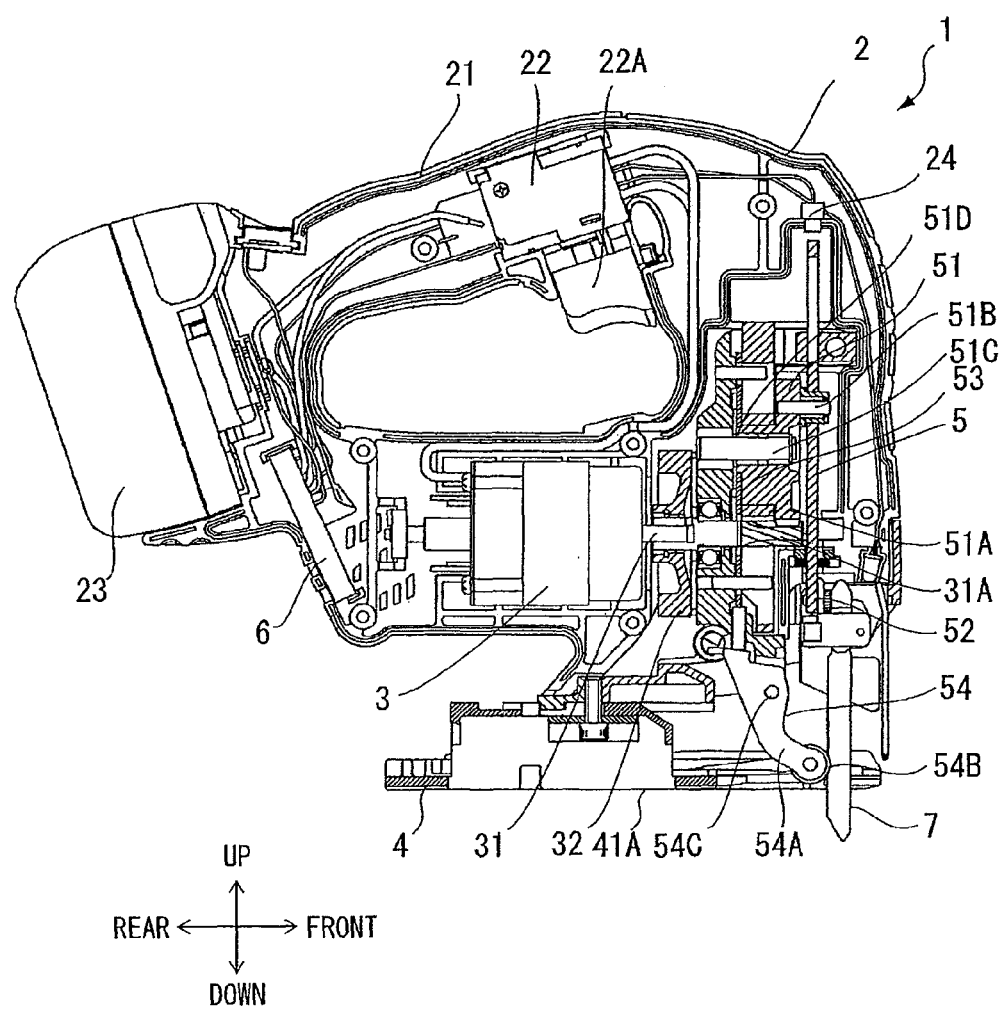
FIG. 5 is a side cross-sectional view of the reciprocating electric tool according to the present embodiment in which the blade is positioned at an upper dead center thereof.

If the blade 7 still protrudes from the base 4 when the user ends using the jigsaw 1, the blade 7 may become an obstacle in accommodating or transporting the jigsaw 1. Therefore, the control circuit 61 according to the present embodiment is configured to control the plunger 52 to stop either at the top dead center or at a position close to the top dead center, as shown in FIG. 5.

When the control circuit 61 detects that the trigger switch 22 outputs no more drive signals of the motor 3, i.e., when cutting the workpiece has ended, the control circuit 61 outputs switching signals of the semiconductor switching elements 62A to the FET drive circuit 62 while observing the position of the plunger 52 based on position signals from the position sensor 24. Upon detecting that the plunger 52 has reached the prescribed position (either at the top dead center or at the position near the top dead center), for example at the top dead center or at the position α2 in FIG. 4, the control/calculation unit 61A stops supplying the switching signals to the FET drive circuit 62 or compulsorily terminates driving the motor 3. In this way, the plunger 52 can stop at the position shown in FIG. 5. Alternatively, the control/calculation unit 61A may stop driving the motor 3 before the plunger 52 reaches the prescribed position.

To the contrary, when the plunger 52 stops at the top dead center or the position in the vicinity of the top dead center at the time of replacement of the blade 7, such a replacement operation will result in low workability because the base 4 covers the blade 7. Hence, the jigsaw 1 according to the present embodiment is provided with the stop position setting means 75 for allowing the plunger 52 to switch stop positions thereof. With the stop position setting means 75, the control/calculation unit 61A can control the motor 3 so that the plunger 52 can be moved to either the bottom dead center (as shown in FIGS. 1 and 4) or a position close to the bottom dead center (positional in FIG. 4) after the plunger 52 has once stopped at the top dead center or the position close to the top dead center.

Alternatively, the storage means 64 may store information indicative of positions at which the stop position setting means 75 sets the plunger 52 to stop (for example, time period required until the stop position of the plunger 52). In this case, the control/calculation unit 61A detects the position of the plunger 52 from the position sensor 24 when the trigger switch 22 is switched off. The control/calculation unit 61A then calculates a period of time required from the detected position of the plunger 52 to the stored stop position using the timer 78, and controls the plunger 52 to stop at the prescribed position.

Still alternatively, instead of providing the stop position setting means 75, the control/calculation unit 61A may control the plunger 52 to stop either at the bottom dead center or at the position close to the bottom dead center based on the signals outputted from the trigger switch 22. Specifically, when the user softly depresses the trigger 22A of the trigger switch 22 once, i.e., the control/calculation unit 61A detects the signal from the trigger 22A once, the control/calculation unit 61A detects the position of the plunger 52 from the position detection section 61B (the position sensor 24 and the plunger position detection circuit 74), thereby controlling the position of the plunger 52 to come to the prescribed position.

Still alternatively, the stop position setting means 75 may not only switch the position of the plunger 52 between the top dead center and the bottom dead center, but may also serve as means to set the stop position of the plunger 52 (a dial or a switch, for example).

As above described, when the stop position setting means 75 is a dial, the user may adjust the dial to the desired stop position. When the stop position setting means 75 is a switch, and especially is provided with a plurality of switches, the user may depress a switch corresponding to the prescribed stop position. When the stop position setting means 75 is provided with only one switch, the user may set the stop position of the plunger 52 by depressing the switch for a predetermined number of times. Based on the stop position signal and the position signals of the plunger 52 (signals from the position sensor 24, signals from the hole ICs 65, 66 and 67), the control/calculation unit 61A may control the motor 3 so that the plunger 52 can stop at the prescribed position.

If the stop position of the plunger 52 is not necessary to be set, the control/calculation unit 61A may control the motor 3 such that the plunger 52 can stop at a prescribed position when the trigger switch 22 is turned off. In this case, the control/calculation unit 61A receives a signal to cancel the settings of position of the plunger 52 when the user presses a reset switch (not shown) or adjusts the stop position setting means 75 (to a position indicative of setting being unnecessary if the plunger 52 is a dial).

The stop position setting means 75 does not necessarily set the stop position of the plunger 52 before the trigger switch 22 is turned on, i.e., before the user starts operating the jigsaw 1. Instead, the stop position of the plunger 52 may be set by the stop position setting means 75 during and after the cutting operations. In this way, the user can determine where to stop the plunger 52 whenever necessary, thereby improving the workability of the jigsaw 1.

Figure 6:
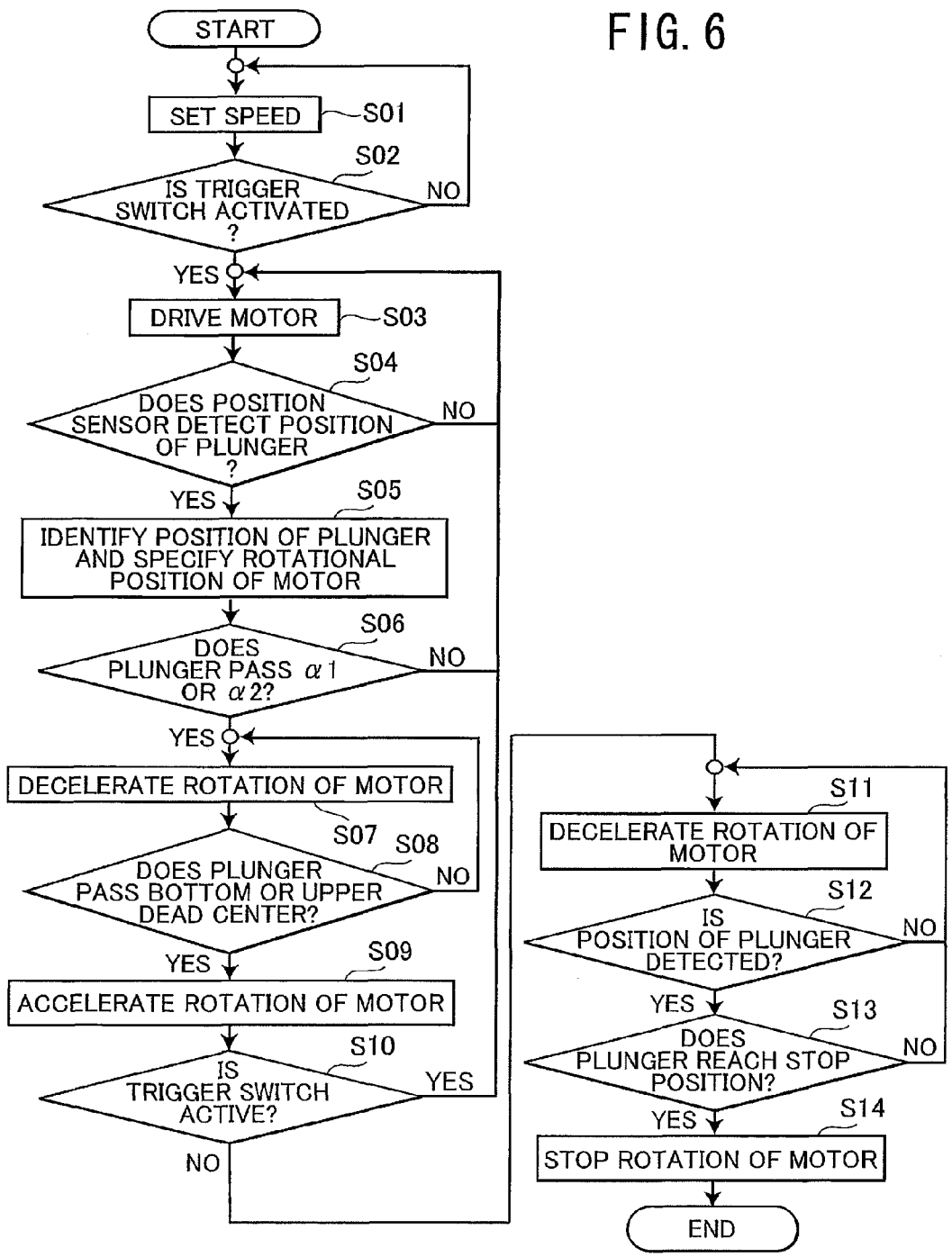
FIG. 6 is a flowchart showing drive control of the plunger of the reciprocating electric tool according to the present embodiment.

Next, a description will be given on how the jigsaw 1 is controlled during the operation thereof with reference to a flowchart in FIG. 6. Note that, in this example shown in this flowchart of FIG. 6, the position sensor 24 is assumed to be used for detecting the position of the plunger 52.

First of all, in S01 the volume VR (the speed setting means 72) sets a speed for the motor 3. In S02 the control circuit 61 determines whether the trigger switch 22 is activated by the user. If the trigger switch 22 is determined not to have been activated since the user does not operate the trigger 22A (S02:NO), the flow returns to S01.

Upon determining in SO2 that the user has operated the trigger 22A to activate the trigger switch 22 (S02:YES), in S03 the control circuit 61 (the control/calculation unit 61A including the speed control section 61C, as shown in FIG. 4) outputs signals to drive the motor 3 (the switching signals H1-H16) to the to the FET drive circuit 62 (to the semiconductor switching elements 62A) in S03. The control circuit 61 then controls the battery 23 to supply electric power to the motor 3, thereby rotating the motor 3 at the speed designated by the volume VR.

In S04 the control circuit 61 determines whether the position sensor 24 has detected the plunger 52. In other words, the control circuit 61 detects whether the plunger 52 is located at a position at which the position sensor 24 can detect, i.e., a position in proximity to either the top dead center or the bottom dead center. As described earlier, the position sensor 24 may instead be configured to always detect the position of the plunger 52.

If the position sensor 24 does not detect the plunger 52 (S04:NO), the flow returns to S03. If the position sensor 24 detects the plunger 52 (S04:YES), in S05 the control/calculation unit 61A (the position detection section 61B) identifies the position of the plunger 52 and specifies the rotating positions of the motor 3 based on the terminal voltages among the stator windings 3C or the hole ICs 65, 66 and 67.

Subsequently in S06, the control/calculation unit 61A (the position detection section 61B) determines whether the plunger 52 has reached the deceleration position set by the deceleration position setting means 76 based on the output signals from the position sensor 24. In the present embodiment, the control/calculation unit 61A determines whether or not the plunger 52 has passed the positional before the bottom dead center or the position α2 before the top dead center. The storage means 64 prestores information on the current position of the plunger 52 relative to each of the positions α1, α2, the top dead center and the bottom dead center (such as time periods set in accordance with the rotational speeds, position signals of the plunger 52, and position signals of the motor 3 and the like). The control/calculation unit 61A determines that the plunger 52 has reached the prescribed position by comparing the actual detected values with the prestored values.

When the control/calculation unit 61A does not detect that the plunger 52 has passed either position α1 or the position α2 (S06:NO), the flow returns to S03. On the other hand, when the control/calculation unit 61A detects that the plunger 52 has passed either one of the position α1 and the position α2 (S06:YES), in S07 the control/calculation unit 61A outputs switching signals H1-H6 to the FET drive circuit 62 so that the rotational speed of the motor 3 can be slowed down to a speed lower than the rotational speed set by the volume VR in S01. Here, the storage means 64 stores decelerated rotational speeds in association with the plurality of setting speeds that the volume VR can designate.

Subsequently in S08 the control/calculation unit 61A determines whether the plunger 52 has passed either one of the top dead center and the bottom dead center based on the signals outputted from the position sensor 24. Alternatively, the control/calculation unit 61A may calculate the current position of the plunger 52 from the information stored in the storage means 64.

When the plunger 52 is determined not to have passed the top dead center nor the bottom dead center (S08:NO), the flow returns to S09 and the motor 3 is maintained at the decelerated speed. Upon detecting that the plunger 52 has passed either the top dead center or the bottom dead center (S08:YES), in S09 the control/calculation unit 61A (the speed control section 61C) controls the outputs of the switching signals H1-H6 to the FET drive circuit 62 so that the rotational speed of the motor 3 can be accelerated up to the speed set by the volume VR in S01.

Subsequently in S10 the control circuit 61 determines whether or not the user has operated the trigger 22A. When the user is operating the trigger 22A and therefore the trigger switch 22 is active (S10:YES), the flow returns to S03 and repeats the steps from S03 to S10.

When the control circuit 61 determines in S10 that the trigger switch 22 has not been activated by the user (S10:NO), in S11 the control/calculation unit 61A (the speed control section 61C) controls the outputs of the switching signals H1-H6 to the FET drive circuit 62, reduces the power supply from the battery 23 to the motor 3, and decelerates the rotational speed of the motor 3.

In S12 the control circuit 61 detects the position of the plunger 52 from the signals of the position sensor 24. When the position of the plunger 52 cannot be detected (S12:NO), the flow returns to S11. The position sensor 24 may be configured to always monitor the position of the plunger 52.

Upon detecting the position of the plunger 52 (S12:YES), in S13 the control/calculation unit 61A (the position detection section 61B) determines whether the plunger 52 has reached the stop position of the motor 3 set by the stop position setting means 75. In the present embodiment, the control/calculation unit 61A determines whether the plunger 52 has reached either the top dead center or the position near the top dead center.

When the plunger 52 has reached neither the top dead center nor the position close to the top dead center (S13:NO), the flow returns to S11. On the other hand, when the plunger 52 has determined to have come to the top dead center or the position near the top dead center (S13:YES), in S14 the control/calculation unit 61A (the speed control section 61C) controls the switching signals H1-H6 outputted to the FET drive circuit 62 so that the motor 3 can stop rotating, thereby completely stopping the rotation of the output shaft 31 of the motor 3. The control circuit 61 then terminates controlling the operation of the jigsaw 1. In this way, when the user can end using the jigsaw 1, the plunger 52 can be positioned at the top dead center or at the position near the top dead center.

When replacing the blade 7, the control/calculation unit 61A controls the blade 7 (the plunger 52) to come to the bottom dead center in S13 and S14. The user may switch the stop position of the plunger 52 from the top dead center to the bottom dead center by manipulating the stop position setting means 75, or by softly pulling the trigger 22A once. With this configuration, since the blade 7 is located at the bottom dead center, the user can easily replace the blade 7 that is mounted on the holding section 52A of the plunger 52.

Next, a variation of the present embodiment will be described with reference to FIG. 8. In the variation, the motor 3 is driven by the AC power source 90 and, instead of employing the position sensor 24, the position of the plunger 52 is detected from the rotating positions and the rotational speeds of the motor 3.

In this variation, the rotating positions and the rotational speeds of the motor 3 are controlled based on the hole ICs 65, 66 and 67 that detect positions of the rotor 3A, and the terminal voltage detection means 77 (See FIG. 3) that detects terminal voltages between the stator windings 3C. In case of employing the brushless motor (the motor 3), detection of the rotating positions and rotational speeds of the motor 3 (the rotor 3A) is inevitably required. Hence, detecting the position of the plunger 52 only from the motor rotation signals, without employing the position sensor 24, can contribute to reduction of the parts, thereby suppressing costs of the parts necessary for the jigsaw 1.

Figure 8:
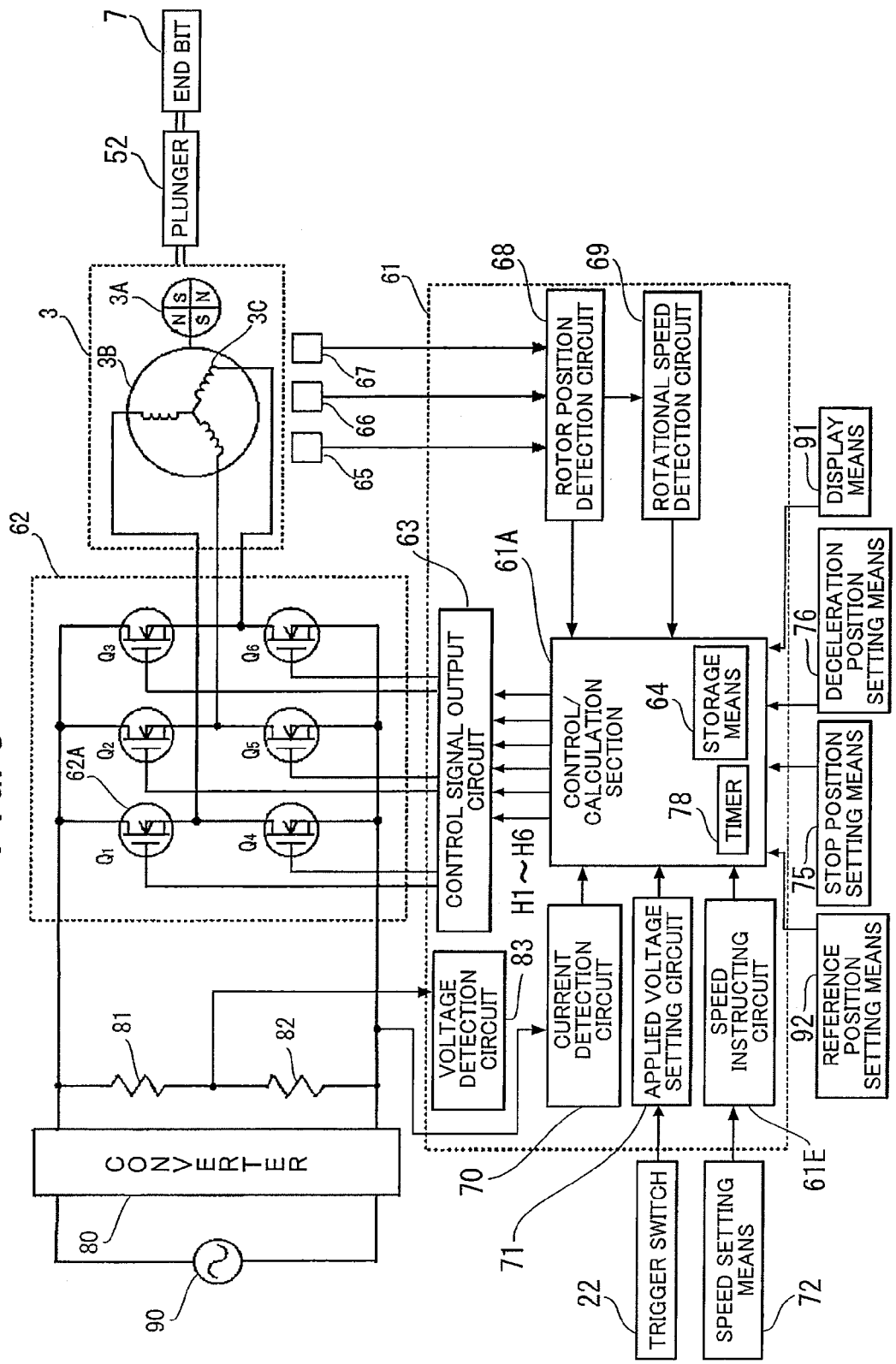
FIG. 8 is a control block diagram of a reciprocating electric tool according to a variation of the present invention.

As shown in FIG. 8, the variation of the present invention is different from the preferred embodiment shown in FIG. 7 in that the position sensor 24 and the plunger position detection circuit 74 are deleted and the AC power source 90 is used for supplying electric power to the motor 3 instead of the battery 23. Since the AC power source 90 is employed, a converter 80, a pair of resistances 81 and 82, and a voltage detection circuit 83 are added in the variation. Further, display means 91 and reference position setting means 92 are also added in the present variation.

The converter 80 converts an AC current coming from the AC power source 90 to a DC current. The resistances 81 and 82 detect the DC current converted by the converter 80. The voltage detection circuit 83 detects the DC current and outputs a detection signal to the control/calculation unit 61A. The display means 91 displays information on the settings of the jigsaw 1. The reference position setting means 92 sets a reference position of the plunger 52. The reference position setting means 92 includes a switch.

When calculating the position of the plunger 52 only from the positional information of the motor 3, one reciprocating movement of the plunger 52 (from the time 0 to the time 2T in FIG. 4) does not necessarily correspond to one revolution of the motor 3 (the rotor 3A). Hence, the position of the plunger 52 and the position of the motor 3 are required to be associated with each other. Hereinafter, how the position of the plunger 52 and the motor 3 are set will be described.

At the time of shipment (or assembly) of the jigsaw 1, an external apparatus rotates the motor 3 for detecting the rotating position of the rotor 3A and the position of the plunger 52. Such an external apparatus may detect the position of the plunger 52 based on a distance between the plunger 52 and a position sensor provided in the external apparatus. Alternatively, a spring may be connected to the plunger 52 so that the external apparatus can detect the position of the plunger 52 based on the tension power of the spring. Other detecting methods may also be applied.

Still alternatively, instead of using such an external apparatus, the positional relationships between the plunger 52 and the motor 3 may be initially determined at the jigsaw 1 itself.

First of all, the plunger 52 is positioned to a reference position, for example, to the top dead center. At this time, the user operates the reference position setting means 92 in order to let the control/calculation unit 61A (the storage means 64) memorize the reference position of the plunger 52 (i.e., the top dead center). Instead of the user, an external device may be used for setting the reference position by monitoring the position of the plunger 52. The control/calculation unit 61A (the storage means 64) has prestored the rpm of the motor 3 required for the plunger 52 to make one reciprocating movement. Here, as an example, the motor 3 is assumed to revolve for ten times during one vertical movement of the plunger 52.

When the motor 3 rotates, the hole ICs 65, 66 and 67 detect the rotating positions and rotational speeds of the rotor 3A. The hole ICs 65, 66 and 67 output pulse signals associated with the polarities of the rotor 3A (the north pole and the south pole). The rotor position detection circuit 68 and the rotational speed detection circuit 69 convert the pulse signals outputted from the hole ICs 65, 66 and 67 into pulse signals in a format that the control/calculation unit 61A can recognize, and then input the same to the control/calculation unit 61A. In case of FIG. 8, since the rotor 3A is provided with a pair of north pole and south pole, the hole ICs 65, 66 and 67 output signals in accordance with changes in each polarity. Specifically, each hole IC outputs two pulses for each revolution of the rotor 3A, and therefore, as a total, six pulses are to be outputted. Hence, when the motor 3 revolves for ten times, each hole IC outputs twenty pulses. That is, the hole ICs 65, 66 and 67 output sixty pulses as a whole. The control/calculation unit 61A prestores this number of pulses outputted from the hole ICs 65, 66 and 67. The control/calculation unit 61A also prestores that the number of pulses is equal to zero when the plunger 52 is located at the reference position set by the reference position setting means 92. In this way, the control/calculation unit 61A can control the plunger 52 based on the rotation information of the motor 3 during one vertical movement of the plunger 52 (i.e., the number of pulses). If the number of pulses inputted to the control/calculation unit 61A needs to be increased for a more accurate control of the plunger 52, additional frequency divider may be provided for the number of pulses outputted from the hole ICs 65, 66 and 67.

At the time of shipment of the jigsaw 1, the reference position of the plunger 52 is set by the reference position setting means 92, and the storage means 64 stores the number of pulses outputted from the hole ICs 65, 66 and 67 for a period during which the plunger 52 makes one reciprocating movement from the reference position. During cutting the workpiece, when the user manipulates the reference position setting means 92, the control/calculation unit 61A can detect the position of the plunger 52 from the rotation information of the motor 3, i.e., the pulse signals outputted from the hole ICs 65, 66 and 67. For example, if the total number of pulses outputted from the hole ICs 65, 66 and 67 is thirty, the control/calculation unit 61A compares the detected number of pulses (thirty pulses) with the pulse information stored in the storage means 64, and determines that the plunger 52 has reached a position corresponding to a half of the number of pulses to be outputted during one reciprocating movement, that is, the plunger 52 has reached the dead center.

When the plunger 52 makes vertical movements for a plurality of times, the control/calculation unit 61A recognizes that the plunger 52 has come to the reference position each time the number of pulses becomes an integral multiple of sixty. If the speed setting means 72 sets the rpm of the motor 3 to 3000 rpm, for example, the motor 3 revolves for fifty times per one second. Hence, in the meantime, the plunger 52 makes five vertical movements. During the five vertical movements, the hole ICs 65, 66 and 67 output three-hundred pulse signals. The control/calculation unit 61A compares the detected number of pulses with the stored number of pulses, and detects the position of the plunger 52. The control/calculation unit 61A can also compare the number of pulses outputted from the hole ICs 65, 66 and 67 with the signals from the deceleration position setting means 76 and the stop position setting means 75, i.e., signals associated with the number of pulses from the hole ICs 65, 66 and 67, thereby accurately detecting that the plunger 52 has reached the deceleration position and the stop position.

In this way, the control/calculation unit 61A can control the motor 3 such that the motor 3 can decelerate and stop at prescribed positions. As above described, the control/calculation unit 61A can detect the position of the plunger 52 only from the rotation position information of the motor 3 (the rotor 3A), even without the position sensor 24 (and the plunger position detection circuit 74 shown in FIG. 7).

Hereinafter, a method for controlling the position of the plunger 52 based on the position information of the motor 3 will be described in detail.

The user operates the trigger switch 22 to start rotating the motor 3. The control circuit 61 is inputted with signals indicative of the rotating position of the motor 3 (pulse signals) detected by the hole ICs 65, 66 and 67 via the rotor position detection circuit 68. The control/calculation unit 61A calculates the position of the plunger 52 from the detected motor position signals (number of pulses) and the motor position information (number of pulses) stored in the storage means 64. For example, if twenty pulses are detected, the control/calculation unit 61A determines that the plunger 52 has not yet reached the bottom dead center (whose number of pulses is thirty).

Simultaneously, the control/calculation unit 61A determines whether the plunger 52 has reached the prescribed deceleration position designated by the deceleration position setting means 76, such as the position before the top dead center and the position before the bottom dead center. Upon determining that the deceleration position has been set to a position corresponding to the number of pulses twenty, the control/calculation unit 61A outputs the (switching) signals H1-H6 to the FET drive circuit 62 for decelerating the rotational speed of the motor 3. Subsequently, upon detecting that the number of pulses coming from the hole ICs 65, 66 and 67 is thirty, the control/calculation unit 61A controls the motor 3 to accelerate.

When detecting that the trigger switch 22 has been turned off, the control/calculation unit 61A determines whether the number of pulses from the hole ICs 65, 66 and 67 indicates that the plunger 52 has reached the prescribed stop position (the top dead center, for example) designated by the stop position setting means 75. Upon determining that the plunger 52 has reached the stop position, the control/calculation unit 61A controls the motor 3 to stop so that the plunger 52 can stop at the stop position. In this way, even if the position sensor 24 is not provided, the position of the plunger 52 can be calculated from the position information of the motor 3 that has been prestored in association with the position of the plunger 52 in the storage means 64.

Further, the jigsaw 1 may also be provided with memory reset means and memory reconfiguring means. The memory reset means resets information on the positional relationship between the plunger 52 and the motor 3 stored in the storage means 64. The memory reconfiguring means re-establishes the positional relationship between the plunger 52 and the motor 3. With the memory reset means and the memory reconfiguring means, old data stored in the storage means 64 can be deleted and the storage means 64 can store latest data therein, enabling a more accurate control of the motor 3. Note that, the stop position setting means 75 and the deceleration position setting means 76 may also serve as the memory reset means and the memory reconfiguring means. If the stop position setting means 75 and the deceleration position setting means 76 are dials, these means 75 and 76 can be so configured as to be switched to either one of the memory reset means and the memory reconfiguring means by successively turning the dials for predetermined times. In case of the stop position setting means 75 and the deceleration position setting means 76 being switches, the means 75 and 76 may be so configured as to be switchable between the memory reset means and the memory reconfiguring means depending on periods of time during which each switch is depressed.

When the memory reconfiguring means is provided, re-configuration of the positional relationship between the motor 3 and the plunger 52 may be performed with the external device used at the time of shipment of the jigsaw 1. However, the re-configuration may also be performed on the jigsaw 1 having the storage means 64. In this case, the position sensor 24 and the plunger position detection circuit 74 are required.

Upon operation of the memory reconfiguring means, the control circuit 61 rotates the motor 3 regardless of the status of the trigger switch 22. The control/calculation unit 61A reads the positional information on the rotor 3A for prescribed angles from the terminal voltages of hole ICs 65, 66 and 67 or the stator windings 3C and stores the same in the storage means 64. At the same time, the control/calculation unit 61A reads the positional information of the plunger 52 in association with the prescribed angles from the position sensor 24, and stores the same in the storage means 64. The control circuit 61 stops rotating the motor 3 and terminates this storing operation. In this way, as long as the positional relationship between the motor 3 and the plunger 52 has been stored, even if the position sensor 24 is broken for some reason, the control circuit 61 can control the motor 3 in accordance with the position of the plunger 52, thereby improving the workability of the jigsaw 1.

Further, since the display means 91 (such as a display or an LED) is provided in the present variation, the user can visually confirm various information on the jigsaw 1. The display means 91 may display, for example, information indicating that the storing operation is in process, the designated rotational speed of the motor 3, and the position of the plunger 52. Hence, the workability will also be enhanced. Also, displaying information can facilitate confirming the storing method and status of the deceleration position and the stop position.

Although the present invention has been described with respect to specific embodiments thereof, it will be appreciated by one skilled in the art that a variety of changes may be made without departing from the scope of the invention.

For example, not only providing one position sensor (the position sensor 24) on the top dead center side of the plunger 52, another position sensor may also be provided on the bottom dead center side. In this case, the position of the plunger 52 can be detected with much high accuracy. Further, other types of sensors may also be employed as the position sensor 24, instead of a proximity sensor.

Further, in addition to the jigsaw 1 as a cutting tool, the present invention can also be applicable to other reciprocating electric tools that have an end bit making vertical movements, such as a saber saw (reciprocating saw), a hammer, a hammer drill and a table jig saw.

Industrial Applicability

The present invention is applicable to reciprocating electric tool such as a jigsaw and any type of electric tool having an end bit which reciprocates.

EXPLANATION OF REFERENCE 1 reciprocating electric tool
2 housing
3 brushless motor
6 control means
24 position sensor
52 plunger

The invention claimed is:

1. A reciprocating electric tool comprising:
a brushless motor;
a plunger driven by the brushless motor and reciprocating between a top dead center and a bottom dead center;
a trigger switch that is operable by a user, and
control means for controlling a rotational speed of the brushless motor based on a position of the plunger, wherein the control means controls the brushless motor in order to stop the plunger at a predetermined position when the control means receives a stop signal through the trigger switch.

2. The reciprocating electric tool according to claim 1, further comprising:
stop position switching means for switching the stop position of the plunger in a proximity to one of the dead centers.

3. The reciprocating electric tool according to claim 1, further comprising:
stop position setting means for setting a stop position of the plunger, wherein
the control means controls the plunger in order to stop the plunger at predetermined position set by the stop position setting means.

4. The reciprocating electric tool according to claim 3, wherein the stop position setting means outputs a signal to the control means, the signal being for stopping the plunger in proximity to either one of the dead centers, and
the control means controls the brushless motor in order to stop the plunger according to the output signal from the stop position setting means.

5. The reciprocating electric tool according to claim 4, wherein
the stop position setting means outputs a switching signal to the control means, the signal being for switching the stop position of the plunger to a position in proximity to an other of the dead centers, and
the control means controls the brushless motor according to the switching signal.

6. The reciprocating electric tool according to claim 1, further comprising:
rotational position detecting means for detecting a rotational position of the brushless motor; and
storage means for prestoring positional data associated with a rotational position of the brushless motor and a position of the plunger, on the basis of the position of the plunger corresponding to the rotational position of the brushless motor, wherein
the control means calculates the position of the plunger on the basis of the rotational position of the brushless motor detected by the rotational position detecting means and positional data stored in the storage means.

7. The reciprocating electric tool according to claim 6, further comprising:
storage reset means for resetting the positional data associated with the rotational position of the brushless motor and the position of the plunger stored in the storage means.

8. The reciprocating electric tool according to claim 6, further comprising:
storage reconfiguring means for reconfiguring positional data associated with the rotational position of the brushless motor and the position of the plunger stored in the storage means.

9. The reciprocating electric tool according to claim 1, further comprising:
a battery for feeding power to the brushless motor.

10. The reciprocating electric tool according to claim 1, further comprising:
an AC power supply for feeding power to the brushless motor.

11. A reciprocating electric tool, comprising:
a brushless motor;
a plunger driven by the brushless motor and reciprocating between a top dead center and a bottom dead center, a cutting blade being mounted to one end of the plunger in a reciprocating direction, the cutting blade being configured to cut a workpiece when the plunger moves from the bottom dead center to the top dead center;

a trigger switch that is operable by a user, control means for controlling the brushless motor to stop the plunger in a predetermined stop area when the control means receives a stop signal through the trigger switch.

12. The reciprocating electric tool according to claim 1, wherein the control means decelerates the rotational speed of the brushless motor when the plunger reaches a position in proximity to and just before the top dead center and the bottom dead center, respectively.

* * * * *